United States Patent
Mills

(10) Patent No.: US 7,790,023 B1
(45) Date of Patent: Sep. 7, 2010

(54) ADJUSTABLE FLOATING WEIR APPARATUS

(76) Inventor: Nickie D. Mills, 5109 Pin Oak Dr., Roanoke, VA (US) 24019

( * ) Notice: Subject to any disclaimer, the term of this patent is extended or adjusted under 35 U.S.C. 154(b) by 0 days.

(21) Appl. No.: 12/008,801

(22) Filed: Jan. 15, 2008

(51) Int. Cl.
*B01D 21/24* (2006.01)

(52) U.S. Cl. .................. 210/122; 210/242.1; 210/532.1; 210/540

(58) Field of Classification Search ................ 210/122, 210/170.05, 242.1, 242.3, 532.1, 540, 776
See application file for complete search history.

(56) References Cited

U.S. PATENT DOCUMENTS

| | | | | |
|---|---|---|---|---|
| 289,877 | A | * | 12/1883 | Wilson ........................ 210/540 |
| 1,107,391 | A | * | 8/1914 | Welch ....................... 210/242.3 |
| 4,015,629 | A | * | 4/1977 | Morgan et al. .............. 137/578 |
| 4,892,666 | A | * | 1/1990 | Paulson .................... 210/242.3 |
| 5,601,705 | A | * | 2/1997 | Glasgow ...................... 210/122 |
| 5,693,218 | A | * | 12/1997 | Yamamoto et al. .......... 210/540 |
| 5,820,751 | A | * | 10/1998 | Faircloth, Jr. ............ 210/242.1 |
| 6,277,287 | B1 | * | 8/2001 | Terrien et al. ........... 210/170.05 |
| 6,905,611 | B2 | * | 6/2005 | Gustafsson ................. 210/540 |

FOREIGN PATENT DOCUMENTS

JP  3-109906  * 5/1991

\* cited by examiner

*Primary Examiner*—Christopher Upton
(74) *Attorney, Agent, or Firm*—Neil F. Markva

(57) ABSTRACT

The apparatus of this invention consists of a float assembly, constrained in its vertical movement by a perforated riser. The riser is surrounded by a flexible, bellows conduit which will allow the float assembly to move up and down the vertically disposed riser. The float assembly supports a weir collar designed to allow multiple weir orifice openings of different sizes. The flexible, bellows conduit is watertight, and prevents water from entering the riser below the float assembly that is buoyed just below the surface of the liquid basin. The riser is connected to an outlet that discharges the liquid from the liquid basin.

7 Claims, 2 Drawing Sheets

ADJUSTABLE FLOATING WEIR APPARATUS

Figure 1:
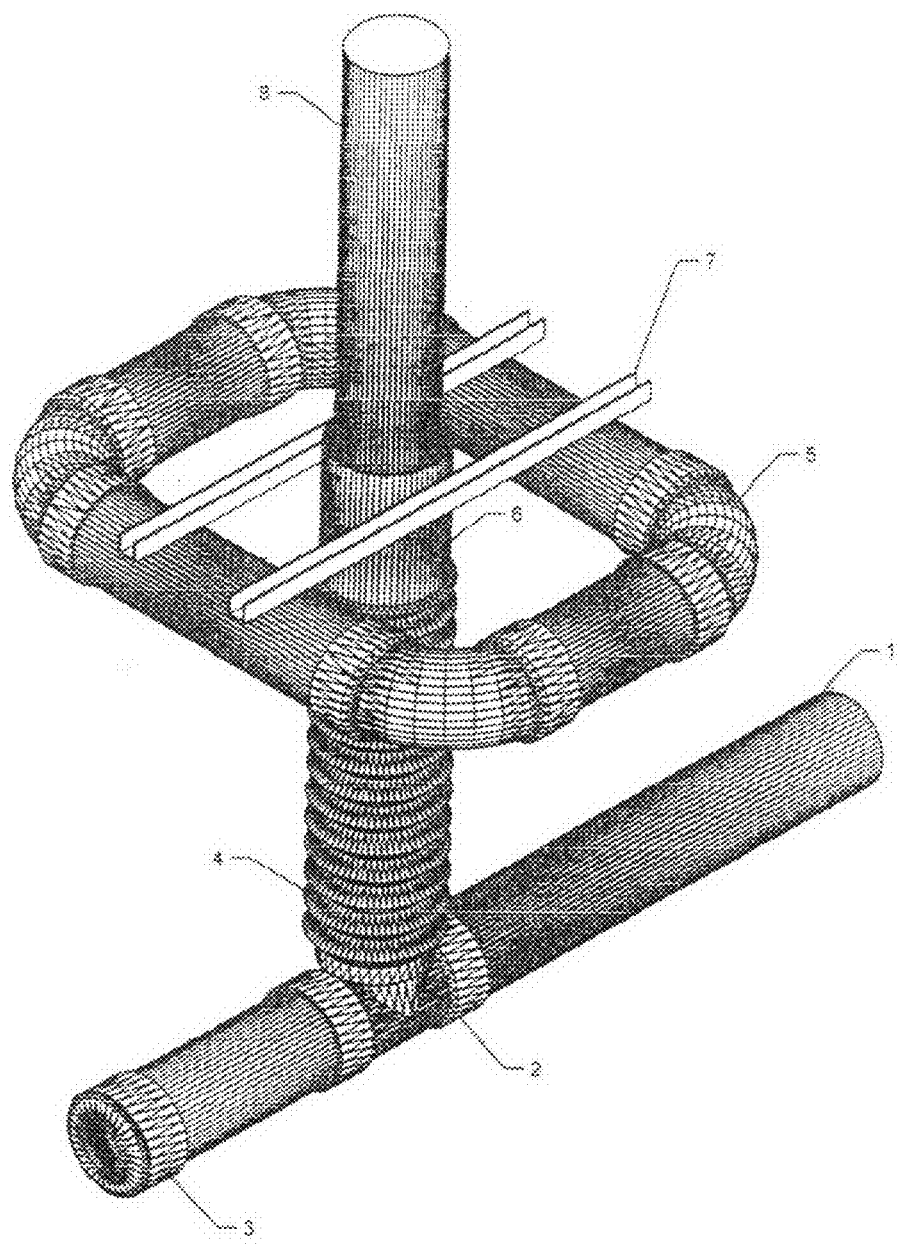

The apparatus of the invention will allow removal of liquid from a free surface at a constant flow rate over varying liquid levels. This is useful in separation of solid sediment due to the fact that it allows liquid to be removed from the surface of a reservoir or liquid basin. The surface of the reservoir is where the fluid discharge column contains fewer and smaller solid sediment. This fact allows the surface skimmer to maximize capture of solid sediment in a reservoir which is especially useful in a liquid capture apparatus that floats on the surface of a liquid, sediment basin.

The apparatus will allow easy variation of fluid removal rate by adjusting the size and number of the openings which allow fluid to enter the liquid capture device. This will allow the same basic device to be used to discharge water from a large variety of liquid basin or reservoir sizes with varying liquid discharging flow rate requirements.

The apparatus consists of a closed loop float assembly 5, a weir collar 6, and a flexible, bellows conduit 4, connected in series to an outlet discharge pipe 1. The float and flexible, bellows conduit 4 are constrained in their vertical, up and down movement by a perforated riser pipe 8 rigidly connected to discharge outlet pipe 1. As is evident in the drawings, C-shaped channels 7 removably, rigidly connect weir collar 6 to float assembly 5. The float assembly 5 and weir collar 6 are connected to the flexible, bellows conduit 4 so that these components can move freely up and down the perforated riser 8 as fluid levels in the liquid basin vary. The arrangement of the perforated riser 8 inside the flexible, bellows conduit 4 allows the assembly 5 and collar 6 to move freely up and down riser 8 while preventing lateral motion of the rigidly connected riser 8 and discharge outlet 1 that may be secured to a ballast block (not shown) to prevent their flotation.

The float assembly 5 serves to provide buoyancy to the apparatus, and serves as a trash guard to keep floating debris from clogging the openings in weir collar 6. The float assembly 5 is a closed loop in the horizontal plane to completely separate the inlet openings in and around collar 6 from the remainder of the liquid basin, minimizing the chances of floating debris fouling the circumferential openings of weir collar 6.

The weir collar 6 which forms the water discharging portion of the apparatus is adjustable to provide for more or less opening width of circumferential openings in collar 6 and annular opening 9 between the outside circumferential surface of riser 8 and the inner circumferential surface of the inside diameter of collar 6. To regulate and adjust flow through the water discharging portion, the size of circumferential openings in the in collar 6 and annular opening 9 may be increased. The flow of discharging water is also adjustable by increasing the number of circumferential openings in collar 6 of the weir assembly. This allows the same basic configuration of assembly 4, 5, 6, 7, 8 to serve different water discharging requirements with minor modifications. Assembly 4, 5, 6, 7, 8 can be manufactured in a small number of standards sizes, requiring only minor modifications to the assembly in the field to achieve the desired water discharging rate.

The outlet pipe is equipped with a T-shaped fitting 2 with an upward portion having an inner circumferential surface that will rigidly connect at the bottom of the perforated riser 8 to form annular opening 9 around riser 8, and a fitting 3 which will allow outlet discharge pipe 1 to be cleaned out. The rigid configuration of riser 8, fitting 2, and outlet discharge pipe 1 will also serve to support the float assembly 5, weir collar 6, and bellows conduit 4 when the liquid basin or reservoir is empty. Assembly 4, 5, 6, 7, 8 is installed in the reservoir so that it can remove all or nearly all of the fluid from the reservoir.

Figure 2:
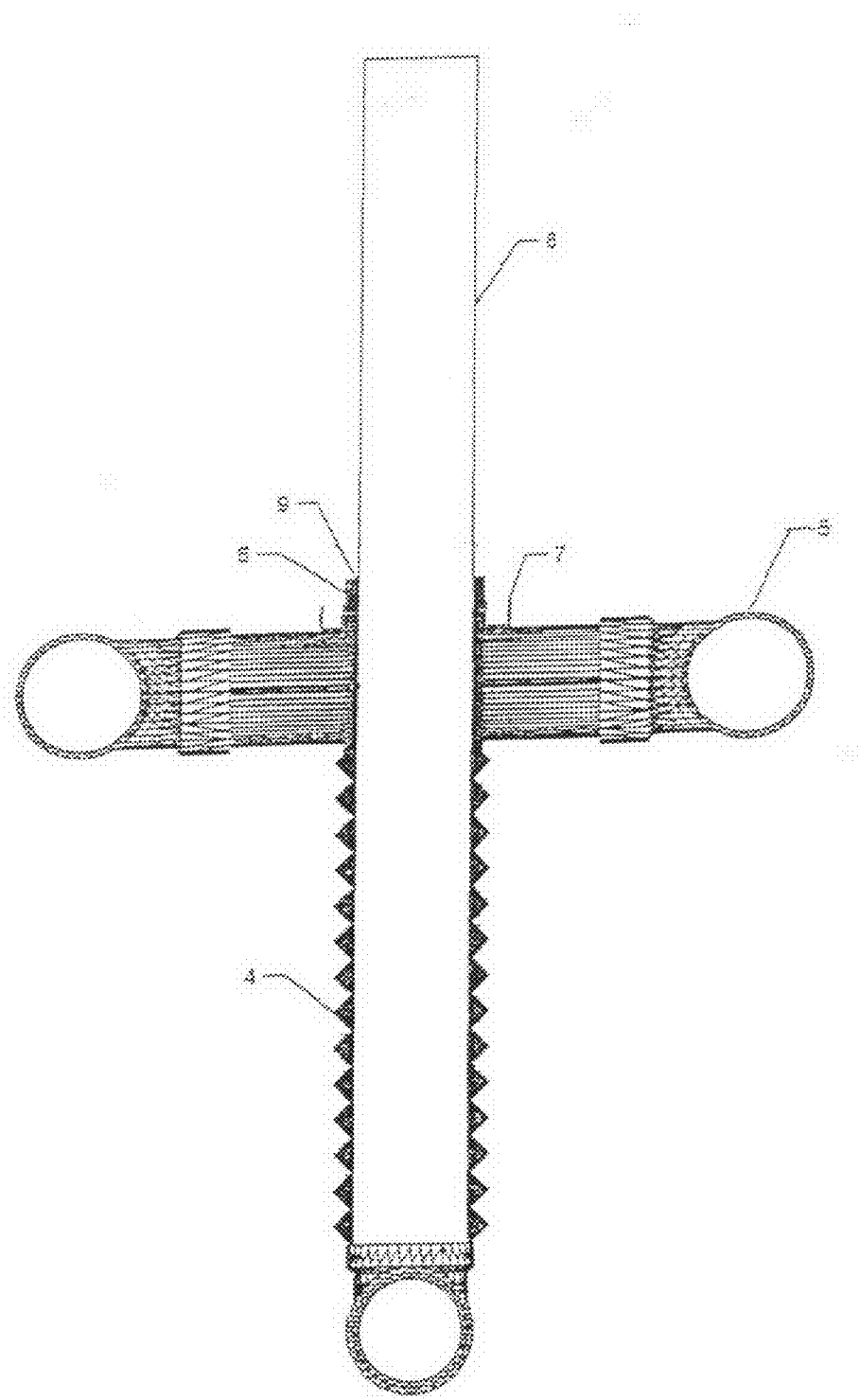

The apparatus shown in FIGS. 1 and 2 is constructed of PVC. but other materials may be suitable and function in like manner as the embodiment shown.

The apparatus is similar in function to a device described by Joseph Adler in a paper entitled "Automatic Device for Emptying a Detention Pond At A Constant Low Flow Rate and Velocity." The apparatus of U.S. Pat. No. 5,820,751 is also similar to a "Water Skimming Apparatus for the Control of Sediment Pollution" patented by Jesse Warren Faircloth. Jr., and to an apparatus of U.S. Pat. No. 4,015,629, inventors Morgan et al.

I claim:

1. An apparatus for removing liquid from a liquid sediment basin provided for sediment control, said apparatus comprising:
   a) a float assembly adapted for floating in liquid collected in said sediment basin;
   b) a weir collar means having an inner circumferential surface, a plurality of circumferential openings for passing said liquid, and rigidly supported by said float assembly so as to be disposed proximally below the surface of said liquid in said sediment basin;
   c) a flexible, bellows conduit having an inner circumferential surface, an upper end connected to a bottom end of the weir collar means, and a lower end connected to an outlet discharge means; and
   d) a perforated riser pipe including a plurality of fluid flow openings disposed circumferentially along said riser pipe circumferential surface, and having a bottom end portion rigidly connected to said outlet discharge means to provide support for the float assembly,
   e) said riser pipe having its outer circumferential surface laterally disposed inwardly from an inner circumferential surface of said inner circumferential surfaces of the weir collar means and bellows conduit to form an annular opening between said inner circumferential surfaces and the outer circumferential surface of the riser pipe;
   f) said riser pipe being effective to allow movement of the weir collar means and flexible, bellows conduit up and down along its outer circumferential surface to enable the float assembly to move up and down with the surface level of liquid in said sediment basin.

2. An apparatus as described in claim 1, wherein said float assembly is configured so as to substantially encompass a substantially open area around said weir collar means to keep floating debris from clogging the collar means.

3. An apparatus as described in claim 1, wherein said float assembly is a closed loop.

4. An apparatus as described in claim 3, wherein said weir collar means includes a solid collar portion having circumferential openings and elongate connectors including outer ends rigidly connected to opposing sides of said closed loop and an intermediate portion rigidly connected to an outer circumferential surface of the solid collar portion.

5. An apparatus as described in claim 4, wherein said elongate connectors comprise C-shaped channels.

6. An apparatus as described in claim 4, wherein said liquid is water and said flexible, bellows conduit is connected to the outer circumferential surface of the riser pipe.

7. An apparatus as described in claim 1, wherein
said outlet discharge means includes an outlet pipe equipped with a T-shaped fitting with an upward portion having an inner circumferential surface rigidly connected at the bottom of the perforated riser, and an outer circumferential surface rigidly connected at the bottom of the flexible, bellows conduit to form an annular opening between said riser and said conduit.

* * * * *